United States Patent [19]
Hoebing

[11] Patent Number: 5,117,296
[45] Date of Patent: May 26, 1992

[54] APPARATUS AND SYNTHETIC HOLOGRAPHY

[76] Inventor: John L. Hoebing, 1229 Leon Pl., Evanston, Ill. 60201

[21] Appl. No.: 554,028

[22] Filed: Jul. 17, 1990

[51] Int. Cl.$^5$ .......................... G03H 1/26; G02B 5/32
[52] U.S. Cl. ......................................... 359/21; 358/2; 359/22
[58] Field of Search .................... 350/3.66, 3.73, 3.74, 350/3.79, 3.78, 3.75; 358/2, 90

[56] References Cited

U.S. PATENT DOCUMENTS

| | | | |
|---|---|---|---|
| 3,612,640 | 10/1971 | Kogelnik | 350/3.79 |
| 3,838,903 | 10/1974 | Leith et al. | 350/3.79 |
| 4,669,812 | 6/1987 | Hoebing | 350/3.73 |
| 4,778,262 | 10/1988 | Haines | 350/3.66 |

Primary Examiner—Bruce Y. Arnold
Assistant Examiner—Martin Lerner
Attorney, Agent, or Firm—Robert A. Brown

[57] ABSTRACT

A novel technique for synthetic holography is disclosed. An image combiner such as a hologram comprising a number of independent off-axis holographic optical elements serves to image a set of off-axis regions to images disposed at various distances along an optical axis; this set of images comprises a synthesized three dimensional object wavefront. These images are derived substantially from off-axis incoherent-to-coherent converters, such as liquid crystal light valves illuminated with a laser. A photosensitive medium is exposed to the wavefront comprising the set of sectional images, the 3-D object wavefront, and simultaneously to a reference wavefront composed of a source coherent with that wave source used to illuminate the incoherent to coherent converters. The resulting synthetic hologram can thus be made with one exposure. The 3-D wavefront may be preprocessed to produce, for instance, a one step synthetic rainbow hologram means which may be employed to produce various synthetic color holograms or a synthetic color volumetric display.

20 Claims, 3 Drawing Sheets

APPARATUS AND SYNTHETIC HOLOGRAPHY

BACKGROUND FOR THE INVENTION

Researchers in holography have long been interested in ways to produce holograms from incoherent data, such as from a set of conventional transparancies of many views of an object or transparancies representing a stack of parallel cross sections of the object. This interest has intensified with the increasing importance of three (or more) dimensional data in electronic or computer based systems, data which may correspond to real images, as from a 3-D medical imaging device, or data which may be abstract output from computer simulations, solutions of differential equations and the like. The prior art has described various synthetic hologram methods to produce holograms of electronic data; these methods often required the steps of producing a particular perspective view or sectional representation of the 3-D data onto a CRT screen, preparing a transparency of each such image component, and producing a hologram according to some predefined synthetic hologram protocol. More recently an "incoherent to coherent converter", such as a liquid crystal light valve or magnetooptical modulator has in some cases come to replace the more time consuming CRT- transparency-subsequent coherent illumination method to obtain coherent components for the required multiplex holograms.

There are numerous references which describe synthetic hologram protocols, for instance the *Handbook of Optical Holography*, or any number of patents in the subclass "Synthetic Holography". These prior art methods all require either a significant number of separate exposures—that is, a large number of separate holograms must be made, one from each of perhaps a thousand perspective views for Cross type multiplex holograms, or one separate hologram of each section of an object for synthetic sectional holograms. Each of these methods requires that multiple exposures be made of each component, a fact that places an unnecessary burden upon the electronic processing system for Cross type holograms. In other techniques for multiple perspective based synthetic holography, one may synthesize a coherent three dimensional image, as in lens sheet arrays, but in order to synthesize a 3-D coherent wavefront one requires an enormous number of 2-D coherent inputs—one for each lens of the array—a process that would require thousands of simultaneous inputs, each uniquely calculated electronically, an unfeasible proposition. Part of the problem with these approaches is that each input component to both the cross holograms or lens sheet arrays contains significant redundant information—a given radiating point of the synthesized image is contained in numerous individual components to create an image of that point from many different perspectives.

Sectional based synthesis offers several unique advantages over the above. For one, there is no redundancy of information in each section; each section contains only information related to a particular distance from the observer so that any given point in a 3-D volume is in general represented by only one point in one section. Another advantage is that the human visual system will interpolate between sections to give an impression of a 3-D image continuous in the depth dimension, even when this 3-D image is composed of as few as 16 separate planes disposed at discrete distances along the depth (or z) axis. Thus, for example, even 3-D data represented electronically as a set of (x,y,z) coordinates with a significant number of different z values may be compressed, for display purposes, by projecting a given point to one of the discrete planar sections: the resulting 3-D image will still be perceived as continuous.

The most serious limitation to synthetic sectional holography is that a separate hologram must be made of some coherent representation of each section. This usually means that there must be some mechanical motion of the apparatus to set up each exposure, for example the distance from the photosensitive hologram plate to the incoherent-coherent means (laser illuminated transparency, liquid crystal screen, and so on) must be varied. Another problem is that in general the hologram results from an incoherent superposition of the separate holograms, since each is recorded independently. This problem is usually solved by making a copy of the original hologram, a process in which one makes a copy of the original poor diffraction efficiency hologram to obtain an efficient final hologram. Thus one requires not only that a separate hologram be made of each section but that the resulting developed hologram must be holographically copied to produce an acceptable final hologram. Synthetic sectional holography has not become commercially popular for many of these reasons.

Sectional holograms are especially useful when the data is naturally represented as a set of points in three dimensions all of which should be visible simultaneously. Examples are sections from biology and medicine, such as results of CAT, MRI and PET scans, or stained sections of anatomical tissue, and so on. Arbitrary 3-D data generated by a computer may also be represented by a section. Recently hologram copying methods, especially embossing methods, have made mass reproduction of holograms economically feasible. It would be useful to be able to generate three dimensional master holograms of educational or commercial value for subsequent distribution, but this usually requires white light viewing. Volume reflection holograms offer one type of white light viewable holograms, and rainbow holograms offer another; rainbow holograms, even as phase relief holograms, may be viewed with appropriate white light illumination so they are especially useful for mass production. Furthermore, rainbow holograms have been shown to offer interesting possibilities for full color holograms even when made with a monochromatic light source. A method and apparatus to produce synthetic rainbow sectional holograms with one exposure would be well suited to producing white light viewable 3-D images and particularly well suited to producing full color synthetic holograms.

OBJECTS OF THE INVENTION

It is amongst the objects of this invention to provide a method and apparatus for one step synthetic holography, and especially to produce synthetic holograms from a number of unique object components.

It is another object of this invention to employ a number of off-axis incoherent to coherent converters and image combining optics to produce a coherent 3-D wavefront, and a further object to provide means and apparatus to record this wavefront as a hologram.

It is a further object of this invention to provide a synthetic holography apparatus which employs holographic optical elements to produce the simultaneous set of coherent on-axis sections, and in particular to employ at least one optical component comprising a set of such HOEs multiplexed in the same medium. A further object is to provide for such a multiplexed HOE which also contains at least one independently controllable hologram, which may serve for example as a template within which to view the sectional wavefront or which may serve to align the optical system.

It is another object of this invention to provide for enhanced means and apparatus for composing the 3-D image prior to recording it as a hologram, and still another object to show such object composing means employing interactive image composing with at least some independent, or parallel, processing and control of the separate object sections.

Another important object of this invention is to provide means and apparatus for processing the synthesized 3-D wavefront prior to recording it as a hologram, and in particular to process the wavefront in a manner suitable for recording it as a white light viewable rainbow hologram.

A further object is to show methods and apparatus for producing synthetic rainbow holograms with advantageous reconstructed color properties. It is another object to provide for advantageous control of the color reconstruction properties of each point of each section of such a hologram.

A particular object is to show means and apparatus in synthetic rainbow holography to provide for two or more superimposed independent rainbow holograms, and especially means for controlling the color reconstructing properties of each point of each section of said independent holograms to provide for the perception of full color at any point of the final hologram.

Another object of this invention is to describe methods and apparatus for displaying sharp polychromatic three dimensional image with sectional components that are illuminated with polychromatic light, in particular to synthesize a 'rainbow volumetric' image from a set of substantially temporally incoherent off-axis wavefronts.

It is another object of this invention to describe methods and apparatus for producing such a 'rainbow volumetric' image which previews the synthetic rainbow hologram that may be produced with the same apparatus using only monochromatic exposures.

It is another object of this invention to describe methods and apparatus for representing, manipulating, and displaying sectional data in a format particularly suitable for producing real time displays.

DETAILED DESCRIPTION OF THE INVENTION

The preferred embodiments of the invention will now be described with reference to the figures. This discussion is intended to show one skilled in the art the best ways to implement the invention but is not intended to limit the scope of the invention; those skilled in the art will recognize many useful ways to implement the invention, including the preferred embodiments illustrated herein.

Figure 1:
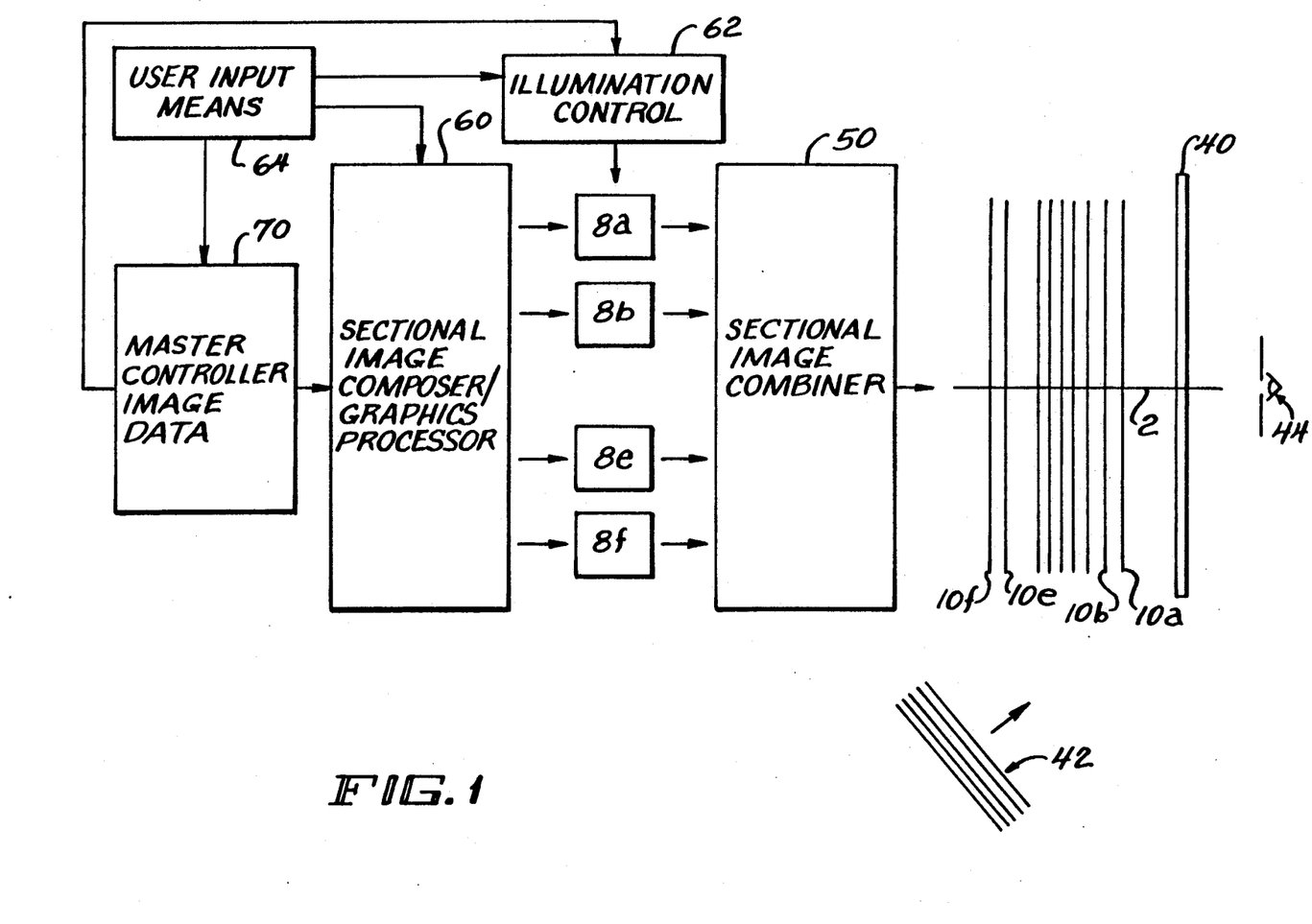
FIG. 1 demonstrates a schematic of the synthetic sectional holography method and apparatus.

FIG. 1 represent a schematic diagram of the method and apparatus for producing a sectional synthetic hologram. An electronic arrangement 70, such as a conventional computer or data processing system, contains and/or controls multidimensional image data which may reside in a separate graphics processor/controller 60. An input control device 64, such as a user interface to these systems, may control the manipulation of the three dimensional information, in particular to control the synthesized image. It may also contain means to move a cursor through the synthesized 3-D space to facilitate composing the 3-D image. The graphics processor/controller 60 controls the incoherent to coherent converters (ICCs) 8a–8f which contain the sectional information and serve as page composers for each section. There are many possible embodiments of these ICCs, which may be photographic transparancies illuminated with laser light, or point addressed magnetooptical arrays, or CRT addressed liquid crystal light values (LCLVs). The prior art describes many possible ICC page composers for holograms, which include various accousto-, magneto-, or electro-optical devices. At the present time, a preferred page composer is a coherently illuminated CRT addressed LCLV; such devices may produce high spatial resolution coherent wavefronts with a favorable dynamic contrast range. In this embodiment, the graphics processor 60 would produce the appropriate sections from the set of 3-D data (which may be a 3-D frame buffer), and would write each section to its corresponding LCLV. Each section may be computer-generated, for example, by some mathematical projection of each 3-D point (x,y,z) to one appropriate section 8z, where z is a discrete location along the z axis corresponding to the location of the final image of a given section.

Since each section (here an LCLV) is independent from any others, it may be highly advantageous to employ some parallel processing means in the master controller 70 or graphics processor 60 to section the data (as by projection) and write the section to the appropriate LCLV. The prior art discusses many such parallel processors for algorithms suited to graphics manipulation; one useful embodiment would contain a hardwired transformation of a given (x,y,z) point in the frame buffer to a (x,y)i point in a bit mapped 2-D buffer in the appropriate LCLV 8i, in which case each LCLV raster could operate in parallel, as could the sectioning means. The manipulation of the 3-D data could also be performed by a parallel processor adapted, for instance, to perform such frequent graphics matrix based transformations as image rotation, scaling, translation, histogram equalization and so on.

The illumination control means 62 may be considered separate from the 2-D display control of the page controller. It could simply be a uniform coherent illumination of each section, as from a laser/beam splitter/diffuser arrangement, or it may be a more complicated protocol which incorporates specific wavefronts for each section, such as wavefronts from advantageous optical and aperture systems which may control, for instance, the visibility of any given point on any section. The ICC wavefront illumination means 62 may also derive from a holographic and/or holographic optical element (HOE) based system which generates the appropriate sectional illuminating wavefronts, for example by transforming an appropriate input reference wavefront. Illumination control 62 may also arrange, for instance, for the path length of the light from all sections to the hologram be equal, or at least within the coherence length of the light source. Control 62 may further provide the coherent light in the form a brief pulse. The ICCs 8a-8f may also contain wavefront transforming optical elements.

The sectional image combining means 50 serves to act simultaneously on each independent sectional component 8a-8f and to thereby create a separate coherent image of each such section disposed at a unique distance along the optical (z) axis 2. In FIG. 1 these sectional images are illustrated as 10a-10f. A number of prior art image combining methods may be used to generate the on axis sections; typical arrangements often use a series of partially silvered beam splitters to serve as image combiners for a plurality of separate regions; U.S. Pat. No. 4,190,856, "Three Dimensional Television System", for example, describes methods and apparatus for producing simultaneous sectional images from independent CRT screens by employing a series of beam splitters and lenses. Said means or other means may be employed for the inventions described herein, but our preferred embodiment would use a single multiplexed holographic optical element to generate the sectional images, and such a HOE will be described later in reference to our preferred embodiment.

The preferred embodiment of our system uses another invention to form the 3-D image from the off-axis sections. This invention is represented in the drawing as the off-axis sections 8a-8d with a mxHOE 20; this invention is "Three Dimensional Display", U.S. Pat. No. 4,669,812. In essence, the mxHOE 20 is a unique hologram comprising a number of independent HOEs, where each HOE has, for instance, a unique focal length and a unique off-axis region which it will image along the axis. These images are represented as 10a-10d. It can be seen that the mxHOE serves to synthesize a three dimensional image comprising the set of images of each off-axis region.

Figure 2:
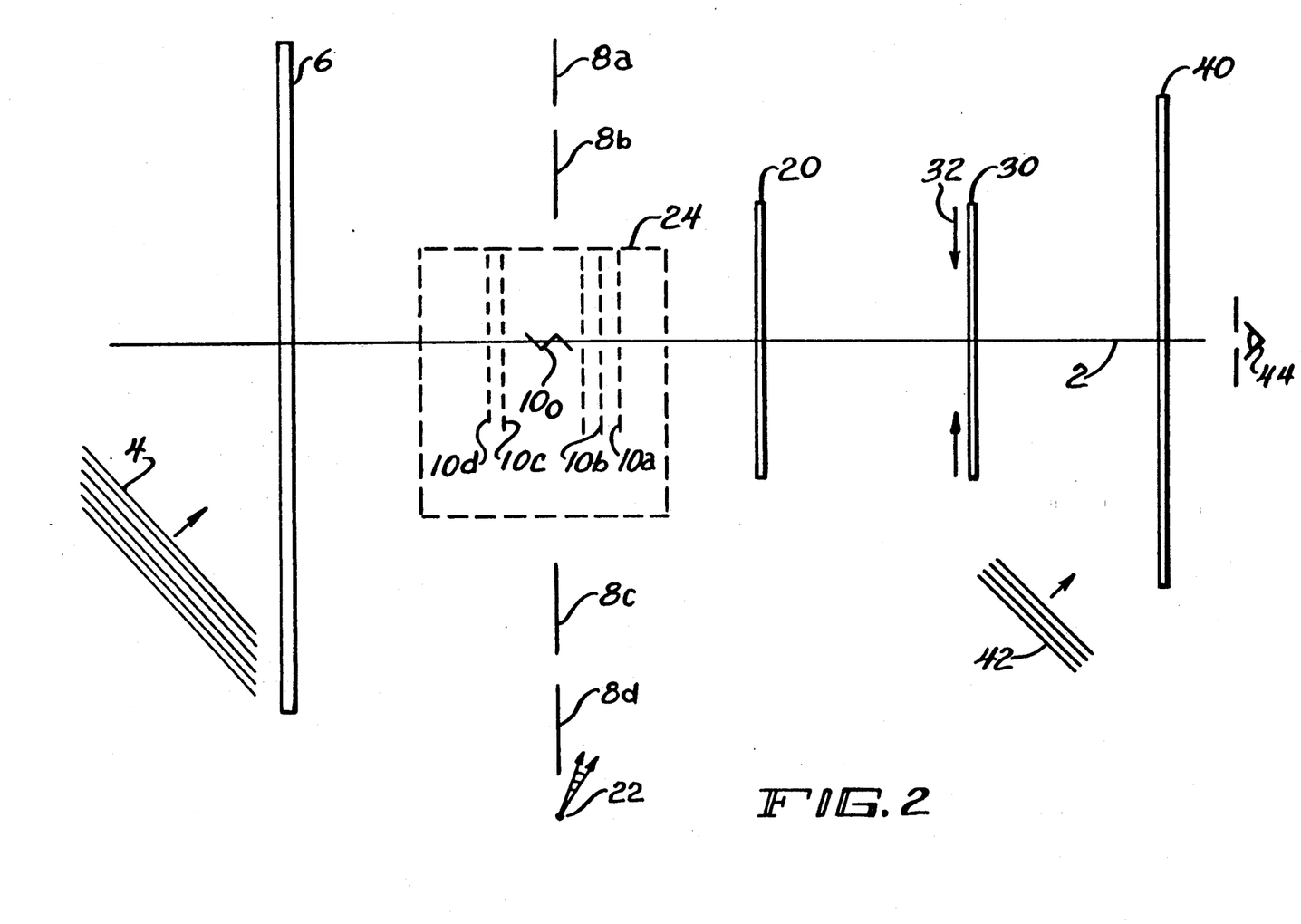
FIG. 2 illustrates all elements of the preferred synthetic holography and display optical system.

The wavefront presented to hologram 40 is also processed by HOE or conventional optical element 30, so one may consider the 3-D synthesizing system to comprise "n" separate optical systems, each system composed of one of the HOEs in mxHOE 20 and the optical element or system 30. In this way, "n" separate optical systems serve to image the "n" off-axis sections to synthesize a 3-D real or virtual image (10a-10d) which is presented as the object wavefront for hologram 40. FIG. 2, therefore demonstrates how each off-axis region—in the preferred case Liquid Crystal Light Valves—need only represent a 2-D object or picture, which requires far less resolution than a hologram. The holographic interference pattern need not be recorded until the hologram plane 40. This further distinguishes this invention from prior art which requires a LCLV to record the holographic interference pattern, as opposed to conventional pictorial intensity pattern as in this invention.

One may now construct a hologram from the set of coherent sections. A photosensitive material 40 suitable for recording a hologram is illuminated with the 3-D "object" wavefront comprising the set of coherent sections and simultaneously with an off-axis reference wavefront 42. This off-axis wavefront may also be derived from or controlled by the illumination control 62; in general the relative strengths of the beams may be adjusted to produce a maximum diffraction efficiency in the photosensitive medium, given the intensities of the sectional images. Those skilled in the art will recognize the wide variety of holograms that may be so made, including but not limited to transmission or reflection, volume or relief, multiplexed spatially or by reference composition, and so on.

An observer 44 may monitor the process, and in fact probably will monitor, edit, or otherwise compose the set of sections via some input means 64. In practice, the observer must usually watch the 3-D image without also exposing the photosensitive hologram plate 40; this may be accomplished with the use of a beam splitter or with some mechanical means to move plate 40 in place at exposure time. However, in some cases it would be preferred to have the observer watch the hologram as it is being made, for example if 40 represents a rapid self developing or "real time" holograms—as in some thermoplastic relief holograms or nonlinear optical effect holograms—then it may be advantageous to simultaneously reconstruct the hologram with another reference source even as it is made with the coherent sections/reference source. This would be the case if one were creating a succession of "rainbow" holograms of the sections in such a way that the holograms would reconstruct a color image upon white light illumination. Such a process will be apparent when full color rainbow holograms are discussed later.

We now turn to a detailed look at the preferred HOE based optical system for generating the synthetic hologram. A multiplexed HOE (mxHOE) based system for producing sectional images has previously been disclosed by this inventor in a patent application (Ser. No. 06/531,040) now U.S. Pat. Ser. No. 4,669,872 issued Jun. 2, 1987, wherein it is described how a number of independent HOEs may be recorded in the same medium with a variety of multiplexing techniques, such as in a set off-axis volume HOEs, where each of said HOEs is constructed in such a way as to image one off-axis section to an image of that section to a certain position along the optical axis. This means and apparatus for synthesizing a 3-D sectional image will be our preferred form, and we review it now. Referring now to FIG. 2, we can examine the role of the mxHOE in the 3-D synthesis procedure. The mxHOE 20 contains a plurality of independent (i.e. multiplexed) HOEs, each of which corresponds to one off-axis region and more particularly to one off-axis sectional component, shown here as 8a-8d. A given HOE may be made holographically, for example, by exposing a photosensitive material to two point sources, one located, say, in the center of region 8a and another along the axis in the center of 10a. Such a HOE will form an image of a coherent sectional region 8a along the z axis 2 at position 10a. Likewise, each other HOE forms an image of one off-axis component along the axis.

Some useful generalizations of the procedure have also been disclosed in the aforementioned pending application. These include the fact that each HOE will in general be created with aberrated wavefronts to compensate for the inherent aberrations in off-axis HOEs; that each HOE may be a lens or mirror analog of an arbitrary optical element, such as a positive lens, a cylindrical lens, and so on, and accordingly that the images of the off-axis regions may be disposed in front of and/or behind the mxHOE 20; that the off-axis regions may be wavefronts of optically transformed sectional components (they may result from another optical element(s)); and that because a given HOE in the mxHOE has unit angular magnification, a further optical system, here represented as element 30, may be employed to further magnify the images. An important observation is that the mxHOE induces a separate optical system for each section; that system comprising for example the off-axis section wavefront, the HOE in mxHOE 20 corresponding to that section, and the further common optical system, here represented as wavefront transforming means 30 and, optionally an observer 44. It is this system that determines the location and qualities of the image of the given section.

FIG. 2 shows only four off-axis regions 8a-8d and shows them lying in one plane. In practice, a larger number of sectional components will be used; 16 to 32 represents a good number, allowing for the production of images 10a, 10b, and so on which can appear to span a continuous volume. Furthermore, the diagram shows the sectional components lying substantially along one line; this is indeed useful if one is volume multiplexing the component HOES because it allows good Bragg separation of each HOE, but it will often be useful to fill as much of the off-axis region as possible with sections, this because one may include many more components (roughly the square of the number of components that would be allowed along only one line) in the sectional component plane. In order to construct a high efficiency mxHOE in this case, it may be useful to spatially multiplex the individual component HOEs in mxHOE 20—each HOE would occupy a unique region of the medium 20, as when each HOE exposure is made with a mask over hologram 20. If 20 is a spatially multiplexed hologram and the sections are arranged in a plane, then in general a given component HOE will form an image of more than one off-axis section, however only only one section—the section is was created to image—will form an image centered on the optical axis; the unwanted spurious images may be prevented from reaching the hologram 40 or viewer 44 by means of an effective field stop. The mxHOE 20 and related optics 30 may dispose the sectional images 10 at any point along the axis 2, and with various magnifications; the images may in fact span the hologram plate 40. The sections, here 8a-8d, each subtend a unique angle with respect to the center of mxHOE 20, and in the preferred embodiment will not only be arranged in a two dimensional field but will lie in one plane. This simplifies the construction of the device; and this is possible because of the unique element 20 which contains a unique HOE for each section, and is therefore capable in conjunction with optics 30 of imaging each such section to a unique position along 2.

The mxHOE may also contain one or more holograms proper, also multiplexed to be read back by a unique reference beam, preferably a simple wavefront such as a point source located outside of the regions of the planar sections. Figure two shows a reference point 22 illuminating the mxHOE 20 to reconstruct a hologram 24. This hologram may be functionally related to the synthesized 3-D sectional wavefront; for instance it may be a 3-D grid, or a 3-D panel meter, or a 3-D image of an anatomical object. The playback of these holograms may be controlled by the illumination control means 62, which may simply allow for the control of the intensity of the reconstruction or may further manipulate the reconstruction by manipulating the reconstructing wavefront 22 according to any of the numerous prior art holographic protocols.

The coherent sections are, as before, created by coherent illumination of the ICCs 8 (the sections 8 may also refer to a wavefront resulting from an optical transformation of an illuminated ICC). The coherent illumination for these sectional wavefronts 8 result from some illumination protocol as discussed in reference to FIG. 1; in FIG. 2 we show a preferred arrangement where a coherent wavefront 4 illuminates and optical system 6—preferably a hologram or HOE, or system composed substantially thereof—and the emerging wavefront illuminates the sectional ICC or ICC systems 8. We have chosen a "holographic/HOE" based paradigm for this system, as well as the remainder of the preferred system, for several reasons. One, we are working with coherent light, and further, holograms or HOEs may be thought of as very general wavefront transformation devices, which include operations such as those commonly performed by bulkier conventional refractive optics. This general transformation may be specified in a computer, and computer holograms generated for use in the constructing reference and/or object wavefronts for final high efficiency HOEs, so it is possible to create more powerful optical elements—especially those with complicated aberration properties or strongly aspheric components—more easily than with lens grinding equipment. In FIG. 2 the ICC illumination means may contain a hologram 6 illuminated with a reference 4; the resulting wavefront enters the sectional system to coherently illuminate the ICCs in any predefined manner. In the case that optical elements or systems 6,8, or 30 are HOEs they may either be one-axis elements, in which case they preferably should have high diffraction efficiency, or they may be off-axis elements. In this case those skilled in the art will recognize that the desired transformed wavefront from said HOEs will be disposed at an angle to the input wavefront, and that one should then consider axis 2 to follow the desired wavefront direction after each transformation; we have represented axis 2 as a straight line as a convenience.

The synthesized 3-D wavefront (e.g. 10a-10d and 24) is now made to illuminate photosensitive medium 40, simultaneously with an off-axis coherent reference wavefront 42. The strengths of the beams are adjusted to provide for maximum diffraction efficiency of the final hologram 40.

It may be highly desirable to make the synthetic hologram viewable with white light, especially in the form of the well known "rainbow holograms" which may be viewed with a white light line source even as a relief phase hologram. There is an extensive prior art relating to rainbow holography, for instance as reviewed in *Handbook of Optical Holography* or *Holography Handbook*, as well as extensively in the patent literature. In essence, to make a rainbow hologram one creates a wavefront of a 2-D or 3-D object through an optical means that effectively creates a resulting wavefront as viewed through a slit aperture. In FIG. 1, for instance, one would create a wavefront 10a such that any given point on 10a would illuminate only a narrow strip of the hologram 40; it would not illuminate the entire hologram as would a "point source" on 10a.

In our arrangement, we can cause each synthesized plane to contain only points that radiate uniformly in one direction (the horizontal) and not in another (the vertical). One embodiment, and a preferred embodiment when we would desire a classical rainbow type hologram that had no vertical parallax, is to generate a 3-D wavefront 10 (and perhaps 24) and then process this wavefront in any of the prior art rainbow techniques. For example, a slit aperture 32 in combination with a cylindrical lens (or preferably HOE analog thereof) can restrict the symmetrical radiating points of the 3-D wavefront to illuminate hologram 40 only along one horizontal line—horizontal being defined with respect to the observer's eyes. Those skilled in the art will recognize the many means for transforming a wavefront to remove vertical parallax from an image; especially means which are not wasteful of light. In the case we have just described, the entire wavefront is processed simultaneously to generate a synthetic rainbow hologram with no vertical parallax.

However, we may also exploit the mxHOE paradigm to describe other means to generate the rainbow hologram that do not destroy vertical parallax. Our mxHOE, in conjunction with optics 6, 8, and 30, for instance, may be viewed as a set of n independent optical systems; one such system containing elements 6, one section of 8, the corresponding HOE in 20, and the element 30. Since 6, 8 and the said component of 20 may have their own illumination protocol, the slit/cylindrical aperture means may reside at any point along this path; for example it may be embedded in illumination means 6 which will efficiently generate a wavefront through 8 which may come as from a slit aperture conjugate to such a slit aperture that would normally follow the image. Each independent system may contain its own slit aperture means; either in the form of the illuminating wavefront from 6 or as part of the optical system 6 and 8$i$. Further, the HOEs in the mxHOE may be cylindrical elements and serve, in conjunction with an aperture (or image thereof) as part of each sectional wavefront 8, produce an image 10 which irradiates the hologram in substantially a narrow strip. The case where the slit/cylindrical processing means are encoded into the wavefront which may be produced by holographic element or system 6 (in conjunction with any elements in 8) is especially useful because it allows for highly efficient use of the input energy 4, since light is not wasted by being blocked by an opaque aperture.

Figure 3:
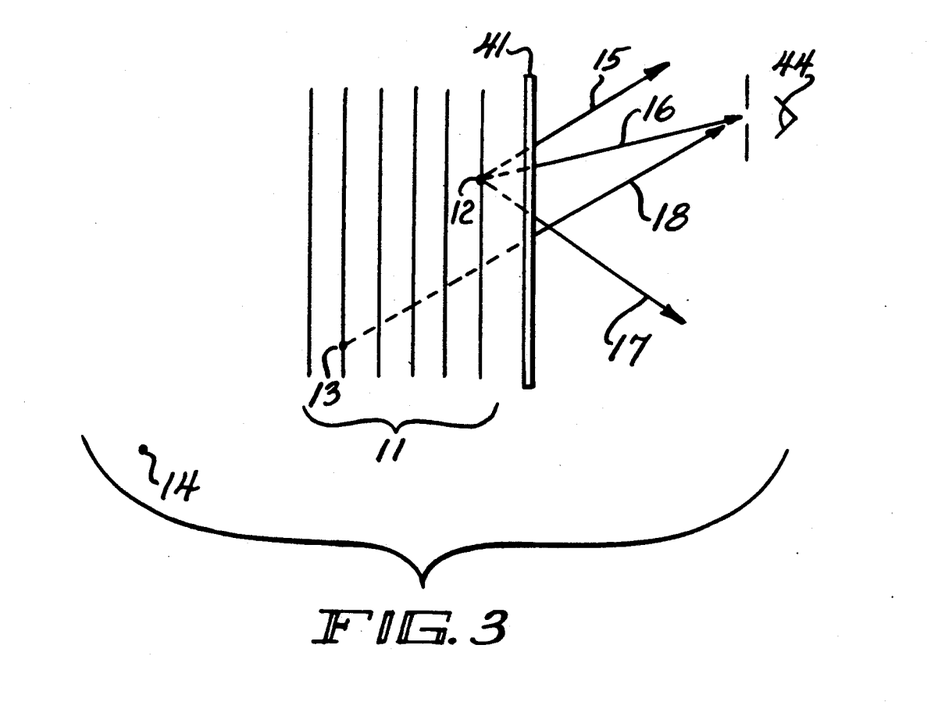
FIG. 3 illustrates a typical reconstruction protocol for a synthetic sectional hologram.

We can now examine the reconstruction of the synthetic hologram. After exposure, hologram 40 may be developed into final hologram 41. FIG. 3 shows such a hologram. In a coherent reconstruction arrangement, a point source reference beam 14 (corresponding to reference 42) illuminates hologram 41 and reconstructs the set of planar images 11. A given point 12 on a given section will radiate coherent light in the directions shown—these rays must also have been present in the synthesized 3-D wavefront. Another point 13 also radiates and is viewed by the observer 44.

In a rainbow arrangement, however, each point in the synthesized wavefront only illuminated the hologram along a slit, and accordingly with coherent reconstruction source 14 will only reconstruct that illumination; the light from point 12 will emanate in all directions along the horizontal, but in only one direction, say 15, in the vertical direction. The eye will have to move into this vertical position to see the point.

However, if the reconstructing source 14 is a white light source (preferably a horizontal line source), then because of the diffractive nature of the hologram 41 point 12 will indeed radiate in many vertical directions, for instance 15, 16, and 17, but each such ray will be a different wavelength w. (w will actually be a narrow frequency distribution centered about some wavelength.) The point will change color as the eye moves up or down. The prior art suggests many ways of controlling the color spread, or change with vertical motion, and in particular gives means for limiting the wavelength change with respect to viewing angle; those skilled in the art will recognize that a variety of such reconstruction characteristics are possible.

This color property of rainbow holograms has been proposed as a means to achieve composite color holograms, for example as described in Holography Handbook. Our invention provides for a new method to create synthetic full color rainbow holograms by using prior art composite techniques in conjunction with our synthetic holography method and apparatus.

Figure 4:
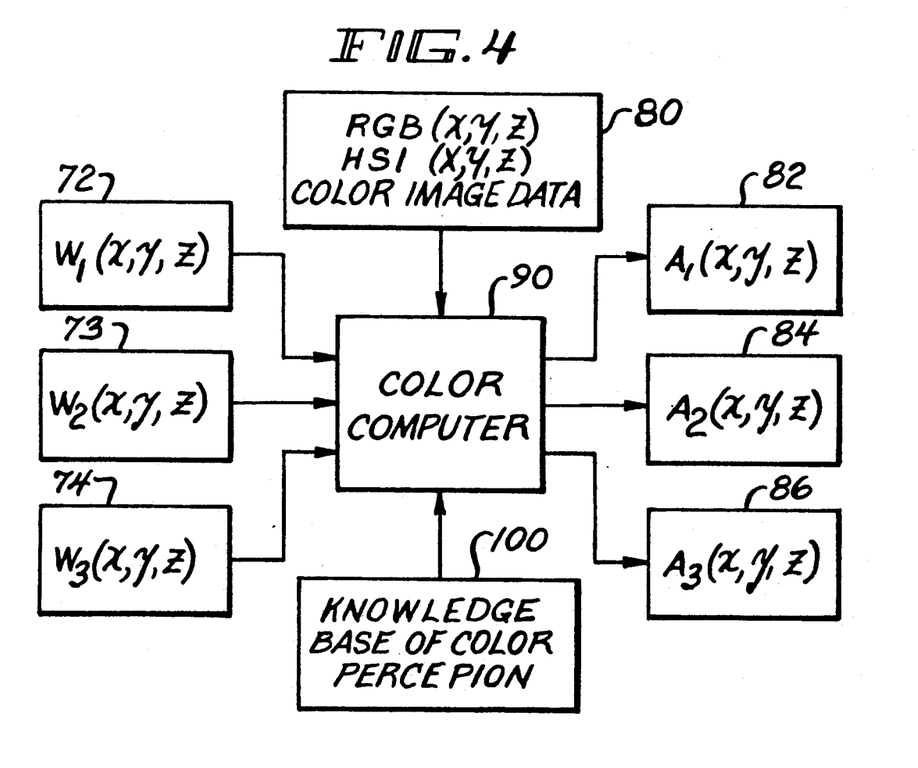
FIG. 4 is a schematic illustration of the means for computing sectional illuminance values, especially for full color synthetic holograms.

Referring to FIGS. 3 and 4, we can see that for a given rainbow recording arrangement (set of parameters—slit/cylindrical means, reference wavefront, and so on), an observer 44 at a given position will perceive any point on any plane as a radiance with color frequency w; this w (actually a narrow band) is fixed for any point on any plane—one can only vary its intensity by varying the transmittance of the off-axis sections, but not w. For any given set of recording parameters, then, we can define a three dimensional function w(x, y, z) ascribing said color to any given (x, y) point on section z. In FIG. 4 item 72 schematically illustrates this fact. However, we can vary the recording parameters, with illumination control means 62, say, or by varying the input wavefront 4 in FIG. 2, to set up a new set of parameters. In particular, we can select a set of parameters to generate three different "coloring sets" 72, 73, and 74 for each such set of said parameters. Then, if one composes an appropriate set of sections (i.e. modulates the intensity of any given point of the ICCs 8) for each of said parameter sets, one can create multiple exposures—one exposure for each color set 72, 73, 74—on the same hologram 40. In this way, the observer 44 in FIG. 3 will see emanating from point 12 three colors along line 16—these colors being fixed by mapping 72, 73, 74—but each color represented in an amplitude corresponding to its modulation in its section during the exposure. By so mixing the colors in their appropriate amounts one can achieve a perceptual color for the observer 44. It is important to note that the colors that one has to mix are different for each (x, y, z) point, and so the amplitude of the section for each point on the section must be computed individually.

FIG. 4 shows the 3-D image represented electronically as an RGB(x, y, z) or HSI(x, y, z) function; the color computer, given the functions 72, 73, 74, must compute for each image point HSI(x, y, z) the corresponding amplitude at (x, y), section z, for each exposure. Since human color visual perception may depend on more complicated image dynamics than a simple frequency mix—it may be highly sensitive to the surrounding colors, patterns, spatial frequencies, and so on, it is useful to endow the computer with such a knowledge base 100 which can aid in the translation from desired image parameters 80 into the appropriate amplitudes 82, 84, 86 for each successive exposure. Note that if 40 is a real time hologram and the repeated exposures are short enough to exceed the flicker fusion rate, then one may observe a full color real time hologram, even though the exposures are made with a monochromatic source.

FIG. 2 also presents us with a means to display, in 'rainbow color' format, 3-D images synthesized from incoherently illuminated sections. Consider the off axis sections 8$a$-8$d$. If these are illuminated with, for example, incandescent broad band source, then just by moving the 'slit apertures' between the sections and the light source 6, or between the sections and the mxHOE (at 20 or 30, then the mxHOE 40 will blur the slits as described in detail above. If the slits are oriented in the proper direction, then each off axis section will appear in rainbow colors. In effect, each point (or, more appropriately, slit) of the off-axis sections will be viewable through the slit aperture (for its particular mxHOE) in only one color—the color with which the image of the slit appears at that location. In this way, we can produce a full 3-D 'rainbow' image with full parallax in all directions. Full parallax is achieved because even though the slit apertures will remove 'vertical' parallax along the direction perpendicular to the slit, this parallax is removed only for the 2-D section. But we do not need parallax for a given section; we achieve full parallax from the independence of the images of each section. One could, therefore, produce not only a 'rainbow volumetric display', but a means of synthetic rainbow holography as well, or an apparatus that provides both features.

Those skilled in the art will recognize many variations on this procedure, including, for instance, variations in the number of composite exposures required to generate color images.

The above examples of realtime and synthetic holography are by not means considered to be exhaustive of the possibilities for methods or apparatus which employ the new principles outlined herein. Those skilled in the art will recognize many other useful variations of this invention.

What is claimed is:

1. Apparatus for creating a synthetic hologram from a set of component sections comprising in operative combination:
   (a) a plurality of selectively composable and illuminable sectional incoherent to coherent converters (ICCs),
   (b) means for illuminating said sectional ICCs with coherent light,
   (c) optical image combining means to form an independent coherent image of each of said sections at an appropriate location along an optical axis,
   (d) a reference wavefront substantially coherent with said means for illuminating said sectional ICCs, and
   (e) a photosensitive medium to record the interference pattern between said reference wavefront and the set of coherent sectional images.

2. A holographic synthesis apparatus as in claim 1 wherein said image combining means comprises a set of off-axis ICCs and a corresponding multiplexed holographic optical element (mxHOE) containing one HOE for each section.

3. A holographic synthesis as in claim 2 wherein sectional illumination means contains a hologram illuminated with coherent light; said hologram producing an output wavefront to advantageously illuminate sectional ICC means.

4. The apparatus as in claim 3 wherein said sectional illumination means, in conjunction with a given ICC and its component HOE substantially suppresses the vertical spread of any point on the resulting sectional image.

5. The apparatus in claim 2 comprising several multiplexed holograms, which holograms may be reconstructed singly or together by control of said reference wavefront.

6. The apparatus in claim 2 wherein sectional imaging means contains a further wavefront transforming HOE or conventional optical system to appropriately transform the entire wavefront emerging from the mxHOE.

7. The apparatus as in claim 6 wherein said further wavefront transforming HOE or conventional optical system performs image angular magnification.

8. The apparatus as in claim 6 wherein said further wavefront transforming HOE or conventional optical system serves to substantially suppress the vertical (with respect to the observer) component of emanating wavefront.

9. A method of creating a synthetic hologram comprising the steps of:
   (a) providing a set of selectively illuminable sectional component incoherent to coherent converters (ICCs),
   (b) providing page composing means for said ICCs,
   (c) providing sectional image combining means to dispose each section to an appropriate location along an optical axis,
   (d) providing appropriate coherent illuminating means to each section,
   (e) providing a coherent reference beam, and
   (f) providing a photosensitive material to record the interference pattern between said sectional coherent source and said coherent reference source.

10. The method of claim 9 wherein said page composing means includes a parallel data processing system to compose the pages substantially independently of each other from given 3-D data.

11. A 3-D display apparatus suitable for composing synthetic holograms comprising:
    (a) a plurality of selectively composable and illuminable incoherent to coherent converters (ICCs),
    (b) an input means to manipulate page composing means for said ICCs,
    (c) image combining means to synthesize a 3-D image,
    (d) means for an observer to view said image, and
    (e) means to accept data from the observer to control said page composing means.

12. The apparatus in claim 11 wherein said image combining means contains a mxHOE which comprises at least one hologram, and means to reconstruct said hologram at the same time as or independently from the mxHOE synthesized section 3-D image.

13. The apparatus in claim 11 whereby said observer may move an object or pointer through a synthesized sectional image to edit the image.

14. The apparatus in claim 13 wherein the observer may isolate or highlight areas of said 3-D image and capture this information back into a data processing image memory.

15. A synthetic color hologram apparatus comprising, in operative combination:
    (a) means of providing a synthetic wavefront composed of a set of sectional images with vertical (perpendicular to axis of full parallax) parallax removed,
    (b) means of controlling a parameter of the illumination of the optical system to achieve said parallax removed,
    (c) means to compute the white light reconstruction frequencies of each point in each sectional image under various playback configurations, (d) means of computing the amplitude of each point on each page of one of said images for a set of successive exposures of a hologram, (e) said means translating a given desired color response into the set of amplitudes of color frequencies for each point in the synthesized volume, and (f) means of controlling the illumination parameters and illuminating the hologram with the successive exposures to successive 3-D images.

16. The apparatus in claim 15 wherein the hologram is a real time hologram and may be reconstructed with white light for each of the said real time holograms.

17. A real time volumetric display wherein the image of one or more of off-axis sections is illuminated by polychromatic light, and passes through a slit aperture between said section and a mxHOE, or at any point of the system conjugate to a region, such that a rainbow image of the region is presented at the point in space where the off-axis region is imaged to by the mxHOE.

18. The apparatus in claim 17 wherein the slit aperture lies between the off-axis section and the mxHOE.

19. The apparatus in claim 17 wherein the slit aperture is a wavefront presented to and illuminating the off-axis section.

20. The apparatus in claim 17 wherein each component of the mxHOE is aberrated in a way such that the image of the slit aperture by its corresponding HOE of the mxHOE is at essentially the same distance from the mxHOE for all of the colors into which the slit is dispersed.

* * * * *